(12) United States Patent
Yoshioka

(10) Patent No.: US 6,210,299 B1
(45) Date of Patent: Apr. 3, 2001

(54) TUBULAR BEAM MOTOR VEHICLE DIFFERENTIAL AXLE ASSEMBLY

(75) Inventor: Jun Yoshioka, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/059,499

(22) Filed: Apr. 13, 1998

(51) Int. Cl.[7] .................................................. F16H 48/08
(52) U.S. Cl. ............................................. 475/230; 74/607
(58) Field of Search ............................... 475/230, 252; 74/607; 180/375; 301/137

(56) References Cited

U.S. PATENT DOCUMENTS

| | | | |
|---|---|---|---|
| 666,085 | * | 1/1901 | Cloughley ............................ 74/607 |
| 783,168 | * | 2/1905 | Baker .................................. 74/607 |
| 1,476,329 | * | 12/1923 | Duesenberg ...................... 475/230 |
| 1,963,660 | | 6/1934 | Greninger ........................... 192/13 |
| 4,221,138 | | 9/1980 | Stewart et al. ..................... 74/607 |
| 4,455,889 | | 6/1984 | Hauser . | |
| 4,799,402 | | 1/1989 | Van Dest ............................. 475/85 |
| 5,286,239 | | 2/1994 | Ito et al. ............................. 475/231 |

* cited by examiner

Primary Examiner—Sherry Estremsky
(74) Attorney, Agent, or Firm—Oldham & Oldham Co., L.P.A.

(57) ABSTRACT

A tubular beam motor vehicle differential axle assembly having two (2) tubular shafts, each of the tubular shafts having gear teeth formed on one end thereof, or alternatively having a gear mechanically connected to the end of the tubular shaft by, for example, a chemical bonding material, a weld, an interference fit and/or one or more mechanical fastener(s), and the other end of each of the tubular shafts having a flange to which a motor vehicle wheel is mounted. A tubular differential case partially houses the two (2) tubular shafts, a set of pinion mate gears and a pinion mate gear shaft. A ring gear is positioned outboard of the tubular differential case which receives rotational power from an input shaft. A differential carrier houses the tubular differential case, as well as the ends of the tubular shafts having the gear teeth, the pinion mate gears and the pinion mate gear shaft and the differential carrier also houses bearings spacers, seals and fasteners, which are preferably of conventional design, for the tubular beam motor vehicle differential axle assembly.

21 Claims, 1 Drawing Sheet

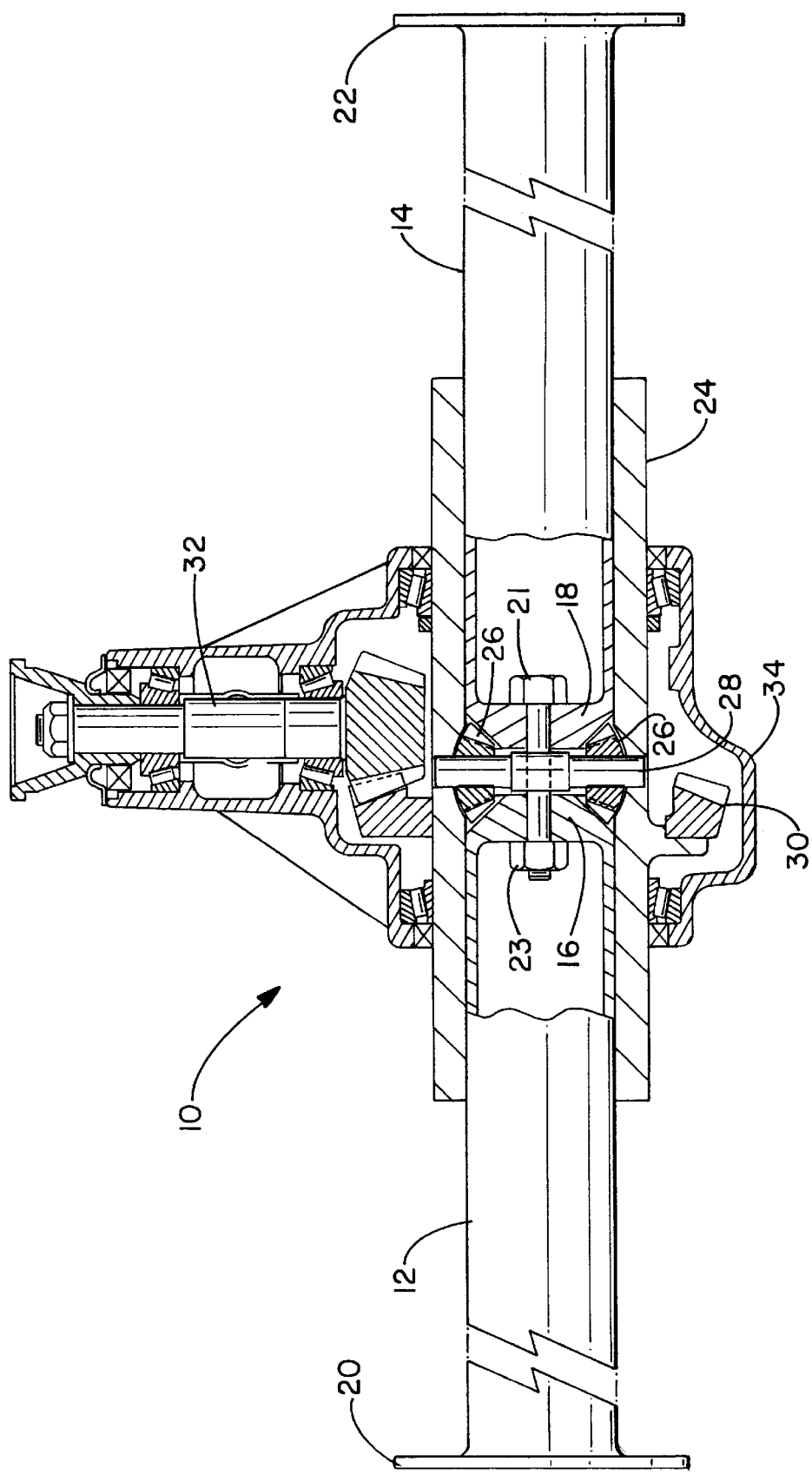

TUBULAR BEAM MOTOR VEHICLE DIFFERENTIAL AXLE ASSEMBLY

BACKGROUND AND SUMMARY OF THE INVENTION

The present invention relates generally to a new and novel tubular beam motor vehicle differential axle assembly. More particularly, the present invention relates to a new and novel tubular beam motor vehicle differential axle assembly having a single structure which acts as both the load carrying structure, as well as the torque transmitting structure.

In known prior art motor vehicle differential axle assemblies, a separate load carrying structure and torque transmitting structure are provided. For example, many known prior art motor vehicle differential axle assemblies include a load carrying structure having tubes and a torque transmitting structure having a carrier connected with axle shafts installed inside of a differential housing.

It would be desirable to provide a motor vehicle differential axle assembly having a single structure which acts as both the load carrying structure, as well as the torque transmitting structure, to reduce the number of parts needed for, and thus the cost of, a functional motor vehicle differential axle assembly.

A preferred embodiment of the present invention is, therefore, directed to a tubular beam motor vehicle differential axle assembly having two (2) tubular shafts, each of the tubular shafts having gear teeth formed on one end thereof, or alternatively having a gear mechanically connected to the end of the tubular shaft by, for example, a chemical bonding material, a weld, an interference fit and/or one or more mechanical fastener(s), and the other end of each of the tubular shafts having a flange to which a motor vehicle wheel is mounted. A tubular differential case partially houses the two (2) tubular shafts, a set of pinion mate gears and a pinion mate gear shaft. A ring gear is positioned outboard of the tubular differential case which receives rotational power from an input shaft. A differential carrier houses the tubular differential case, as well as the ends of the tubular shafts having the gear teeth, the pinion mate gears and the pinion mate gear shaft and the differential carrier also houses bearings, spacers, seals and fasteners, which are preferably of conventional design, for the tubular beam motor vehicle differential axle assembly.

Other advantages and novel features of the present invention will become apparent in the following detailed description of the invention when considered in conjunction with the accompanying drawing.

BRIEF DESCRIPTION OF THE DRAWINGS

FIG. 1 is a side elevational view, partially in cross-section and partially in plan view, of a tubular beam motor vehicle differential axle assembly in accordance with a preferred embodiment of the present invention.

DETAILED DESCRIPTION OF THE DRAWINGS

In the following detailed description of a preferred embodiment of the present invention, reference is made to the accompanying drawing which, in conjunction with this detailed description, illustrates and describes a preferred embodiment of a tubular beam motor vehicle differential axle assembly, generally identified by reference number 10, in accordance with the present invention. Referring now to the drawing, attention is directed to FIG. 1, which illustrates a side elevational view, partially in cross-section and partially in plan view, of tubular beam motor vehicle differential axle assembly 10 in accordance with a preferred embodiment of the present invention. Tubular beam motor vehicle differential axle assembly 10 generally includes first tubular shaft 12 and second tubular shaft 14, each of first tubular shaft 12 and second tubular shaft 14 having gear teeth 16 and 18, respectively, on one end thereof. Gear teeth 16 and 18 may be formed integrally on one end of first tubular shaft 12 and second tubular shaft 14, respectively, or alternatively, two (2) gears having gear teeth 16 and gear teeth 18, respectively, formed therein can be mechanically connected to the one end of first tubular shaft 12 and second tubular shaft 14, respectively, by, for example, a chemical bonding material, a weld, an interference fit and/or one or more mechanical fastener(s). The other end of first tubular shaft 12 and second tubular shaft 14 have flanges 20 and 22, respectively, to which motor vehicle wheels (not shown) are mounted.

Tubular differential case 24 partially houses the ends of first tubular shaft 12 and second tubular shaft 14 having gear teeth 16 and 18, respectively, as well as a set of pinion mate gears 26 and pinion mate gear shaft 28. Ring gear 30 is positioned outboard of tubular differential case 24 and receives rotational power from input shaft 32. Differential carrier 34 houses tubular differential case 24, as well as the ends of first tubular shaft 12 and second tubular shaft 14 having gear teeth 16 and 18, respectively, pinion mate gears 26 and pinion mate gear shaft 28.

A fastening arrangement including bolt 21 and nut 23 is provided to connect the gear having gear teeth 16 and the gear having gear teeth 18 to provide for mechanical fastening of first tubular shaft 12 and second tubular shaft 14 axially to differential carrier. The fastening arrangement including bolt 21 and nut 23 also provides for proper adjustment for backlash between the gear having gear teeth 16 and the gear having gear teeth 18. Differential carrier 34 also houses bearings, spacers, seals and fasteners, which are preferably of conventional design, for tubular beam motor vehicle differential assembly 10.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A tubular beam motor vehicle differential axle assembly comprising:
   a tubular differential case;
   a first tubular shaft extending outwardly in a first direction from said tubular differential case, said first tubular shaft having gear teeth on one end thereof;
   a second tubular shaft extending outwardly in a second direction substantially opposite to said first direction from said tubular differential case, said second tubular shaft having gear teeth on one end thereof;
   a set of pinion mate gears having gear teeth which engage with said gear teeth on said first tubular shaft and said gear teeth on said second tubular shaft; and
   a pinion mate gear shaft attached to each of said set of pinion mate gears.

2. The tubular beam motor vehicle differential axle assembly in accordance with claim 1, wherein said gear teeth are formed integrally into at least one of said one end of said first tubular shaft and said one end of said second tubular shaft.

3. The tubular beam motor vehicle differential axle assembly in accordance with claim 2, wherein:

said first tubular shaft has a second end distal from said one end and said second end of said first tubular shaft includes a flange for mounting a motor vehicle wheel thereon; and said second tubular shaft has a second end distal from said one end and said second end of said second tubular shaft includes a flange for mounting a motor vehicle wheel thereon.

4. The tubular beam motor vehicle differential axle assembly in accordance with claim 1, wherein said gear teeth are formed integrally into said one end of said first tubular shaft and into said one end of said second tubular shaft.

5. The tubular beam motor vehicle differential axle assembly in accordance with claim 4, wherein:

said first tubular shaft has a second end distal from said one end and said second end of said first tubular shaft includes a flange for mounting a motor vehicle wheel thereon; and said second tubular shaft has a second end distal from said one end and said second end of said second tubular shaft includes a flange for mounting a motor vehicle wheel thereon.

6. The tubular beam motor vehicle differential axle assembly in accordance with claim 1, wherein said gear teeth are formed in a gear and said gear is mechanically connected to at least one of said one end of said first tubular shaft and said one end of said second tubular shaft.

7. The tubular beam motor vehicle differential axle assembly in accordance with claim 6, wherein:

said first tubular shaft has a second end distal from said one end and said second end of said first tubular shaft includes a flange for mounting a motor vehicle wheel thereon; and said second tubular shaft has a second end distal from said one end and said second end of said second tubular shaft includes a flange for mounting a motor vehicle wheel thereon.

8. The tubular beam motor vehicle differential axle assembly in accordance with claim 1, wherein said gear teeth are formed in a first gear and a second gear and said first gear is mechanically connected to said one end of said first tubular shaft and said second gear is mechanically connected to said one end of said second tubular shaft.

9. The tubular beam motor vehicle differential axle assembly in accordance with claim 1, wherein said gear teeth are formed in a gear and said gear is mechanically connected to at least one of said one end of said first tubular shaft and said one end of said second tubular shaft by a chemical bonding material.

10. The tubular beam motor vehicle differential axle assembly in accordance with claim 1, wherein said gear teeth are formed in a first gear and a second gear and said first gear is mechanically connected to said one end of said first tubular shaft by a chemical bonding material and said second gear is mechanically connected to said one end of said second tubular shaft by a chemical bonding material.

11. The tubular beam motor vehicle differential axle assembly in accordance with claim 1, wherein said gear teeth are formed in a gear and said gear is mechanically connected to at least one of said one end of said first tubular shaft and said one end of said second tubular shaft by a weld.

12. The tubular beam motor vehicle differential axle assembly in accordance with claim 1, wherein said gear teeth are formed in a first gear and a second gear and said first gear is mechanically connected to said one end of said first tubular shaft by a weld and said second gear is mechanically connected to said one end of said second tubular shaft by a weld.

13. The tubular beam motor vehicle differential axle assembly in accordance with claim 1, wherein said gear teeth are formed in a gear and said gear is mechanically connected to at least one of said one end of said first tubular shaft and said one end of said second tubular shaft by an interference fit.

14. The tubular beam motor vehicle differential axle assembly in accordance with claim 1, wherein said gear teeth are formed in a first gear and a second gear and said first gear is mechanically connected to said one end of said first tubular shaft by an interference fit and said second gear is mechanically connected to said one end of said second tubular shaft by an interference fit.

15. The tubular beam motor vehicle differential axle assembly in accordance with claim 1, wherein said gear teeth are formed in a gear and said gear is mechanically connected to at least one of said one end of said first tubular shaft and said one end of said second tubular shaft by at least one mechanical fastener.

16. The tubular beam motor vehicle differential axle assembly in accordance with claim 1, wherein said gear teeth are formed in a first gear and a second gear and said first gear is mechanically connected to said one end of said first tubular shaft by at least one mechanical fastener and said second gear is mechanically connected to said one end of said second tubular shaft by at least one mechanical fastener.

17. The tubular beam motor vehicle differential axle assembly in accordance with claim 1, wherein:

said first tubular shaft has a second end distal from said one end and said second end of said first tubular shaft includes a flange for mounting a motor vehicle wheel thereon; and said second tubular shaft has a second end distal from said one end and said second end of said second tubular shaft includes a flange for mounting a motor vehicle wheel thereon.

18. The tubular beam motor vehicle differential axle assembly in accordance with claim 17, wherein said set of pinion mate gears includes two (2) pinion mate gears.

19. The tubular beam motor vehicle differential axle assembly in accordance with claim 1, wherein said set of pinion mate gears includes two (2) pinion mate gears.

20. The tubular beam motor vehicle differential axle assembly in accordance with claim 1, wherein said set of pinion mate gears includes four (4) pinion mate gears.

21. The tubular beam motor vehicle differential in accordance with claim 1, wherein said first tubular shaft having gear teeth on one end thereof and said second tubular shaft having gear teeth on one end thereof are retained using a fastening arrangement including a bolt and a nut which is substantially coaxial to said first tubular shaft and said second tubular shaft.

* * * * *